(No Model.)  3 Sheets—Sheet 1.
L. COES.
PROCESS OF AND APPARATUS FOR TREATING SEWAGE.
No. 368,071. Patented Aug. 9, 1887.
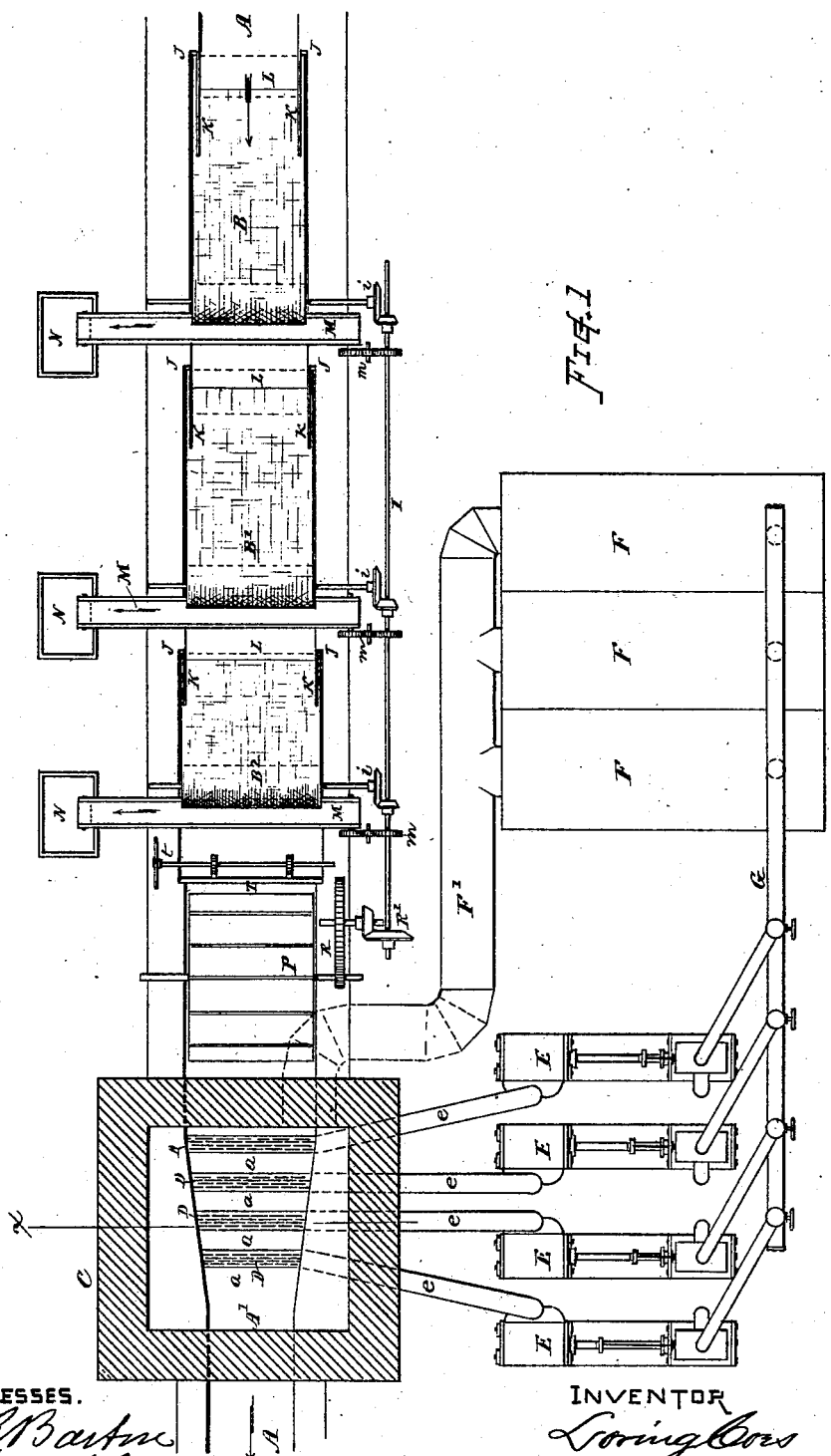
WITNESSES.
INVENTOR (No Model.)  3 Sheets—Sheet 2.
L. COES.
PROCESS OF AND APPARATUS FOR TREATING SEWAGE.
No. 368,071.  Patented Aug. 9, 1887.
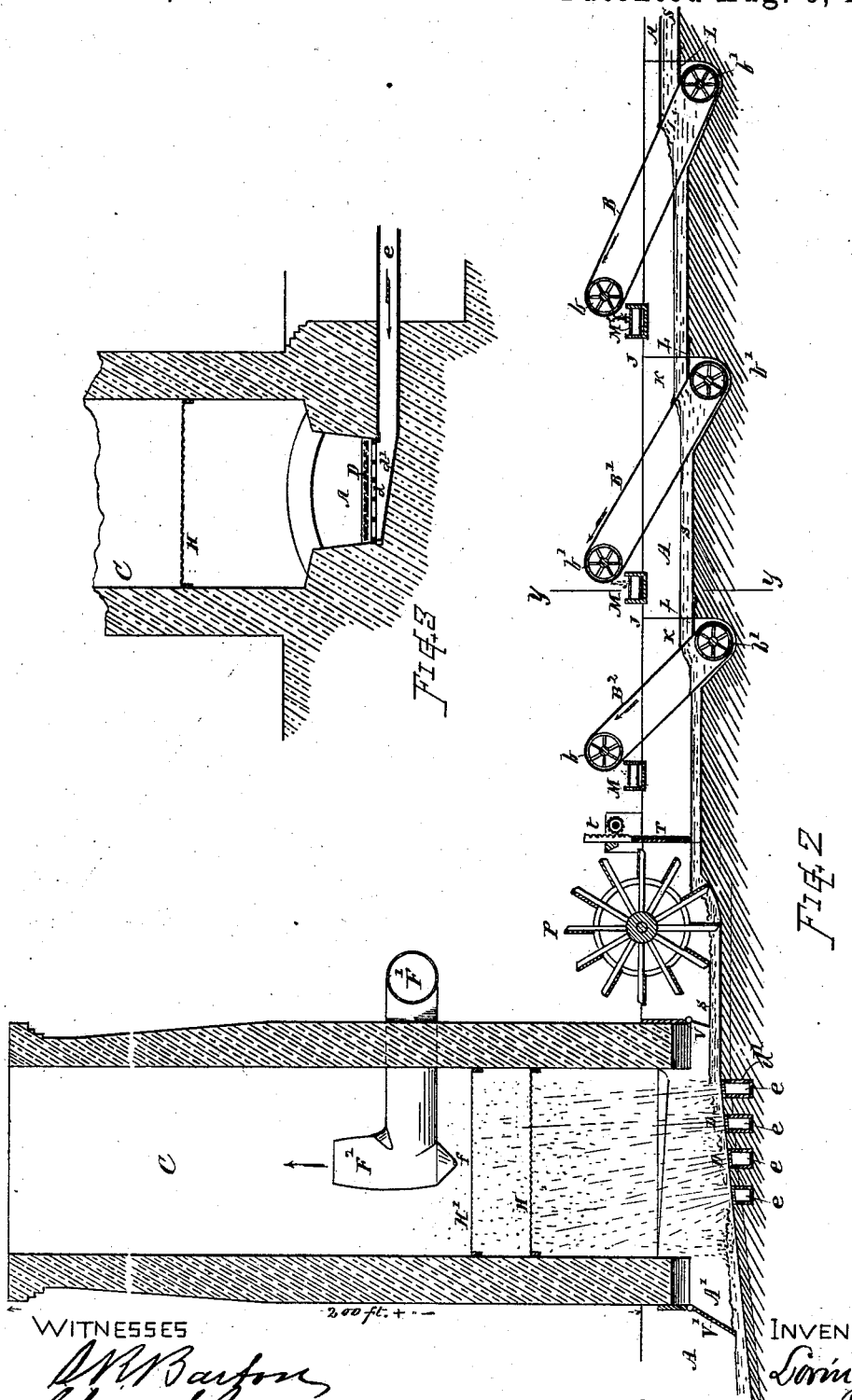

(No Model.) 3 Sheets—Sheet 3.

L. COES.
PROCESS OF AND APPARATUS FOR TREATING SEWAGE.

No. 368,071. Patented Aug. 9, 1887.

WITNESSES
J. R. Barton
Charles S. Bacon

INVENTOR
Loring Coes
By Chas. H. Burleigh
Attorney

UNITED STATES PATENT OFFICE.

LORING COES, OF WORCESTER, MASSACHUSETTS.

PROCESS OF AND APPARATUS FOR TREATING SEWAGE.

SPECIFICATION forming part of Letters Patent No. 368,071, dated August 9, 1887.

Application filed December 20, 1886. Serial No. 222,048. (No model.)

*To all whom it may concern:*

Be it known that I, LORING COES, a citizen of the United States, residing at Worcester, in the county of Worcester and State of Massachusetts, have invented certain new and useful Improvements in Processes of and Apparatus for Treating Sewage, &c., of which the following, together with the accompanying drawings, is a specification sufficiently full, clear, and exact to enable persons skilled in the art to which this invention appertains to make and use the same.

The object of my present invention is to provide a method and means for purifying and disinfecting sewage or liquid containing foul matter in solution or admixture therewith; also to provide an apparatus whereby the flow of liquid or sewage is separated into spray or finely-divided particles within the chamber of a chimney or stack by a forced current of air or gas and the rising sewage vapors mingled within the chimney with the hot products of combustion from the furnaces, as more fully hereinafter explained; also to provide a series of self-clearing screens for removing floating substances from the stream of sewage as it approaches the purifying chamber. These objects I attain by means substantially as illustrated and described, the particular subject-matter claimed being hereinafter definitely specified.

Figure 4:
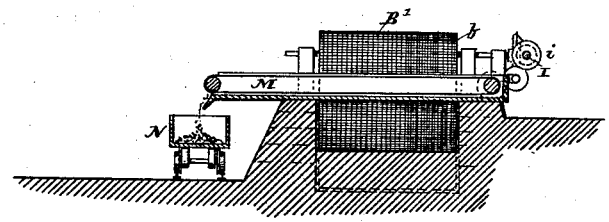
Figure 5:
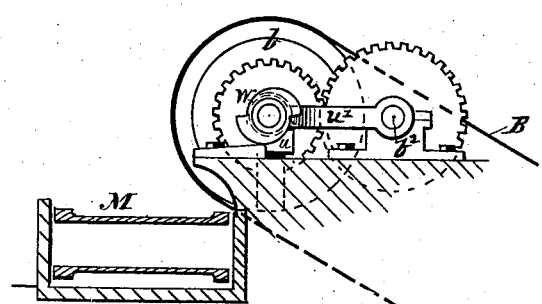
Figure 6:
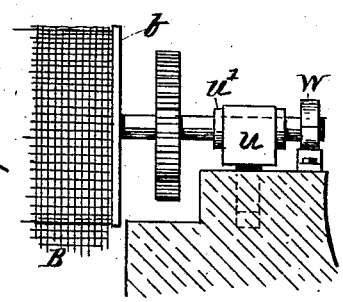
Figure 8:
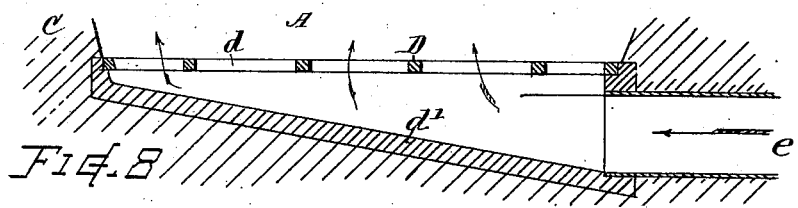
Figure 7:
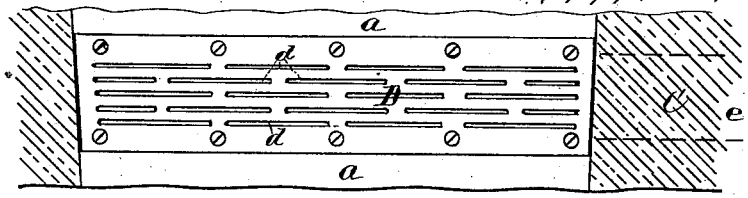
Figure 9:
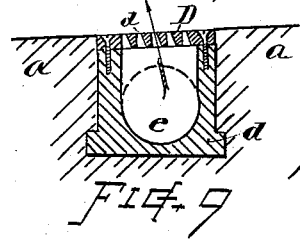

In the drawings, Figure 1 is a plan view of so much of a plant for treating sewage as will illustrate the nature of my invention. Fig. 2 is a longitudinal section of the same. Fig. 3 is a transverse section through the lower part of the chimney-stack and blast-tuyere at line $x$ in Fig. 1. Fig. 4 is a transverse section across the channel below one of the screens, at line $y$ $y$ in Fig. 2. Figs. 5 and 6 are detail views, end and side, illustrating a mechanism for imparting a jar to the screens. Fig. 7 is a plan view of the tuyere-plate. Fig. 8 is a longitudinal section of the tuyere, and Fig. 9 is a transverse section of the tuyere.

In my improved method of treating sewage the liquid is caused to flow through the base of a tall chimney-stack or tower and over perforated plates or tuyeres, through which is forced a strong current of atmospheric air or other gas, which elevates or throws up the liquid in spray or finely-divided particles within the chamber of the stack, where it is mingled with the air or blast, the heavier portions falling back in a shower to be again elevated or to escape through the exit-passage, and the lighter portions and foul vapors being mingled with the hot products of combustion from furnaces, or with steam from boilers, so as to effect the purification and disinfection of the liquid before it passes to the stream or water-course into which it is finally discharged. Preceding the entrance of the sewage to the chamber or stack, I prefer to employ a series of screens formed as endless revolving aprons, that collect floating matter and deliver it to endless laterally-disposed transfer-aprons, which deposit the same in cars or vats, where it can be conveniently removed or utilized, as desired. The screens and transfer-aprons may be operated by a wheel worked by the flowing stream, or by other power.

In reference to parts, A indicates the channel or water-way through which the sewage is conducted for treatment.

B, B', and B² indicate screens or strainers, of different degrees of fineness, arranged across said channel for removing floating solid matter from the liquid.

C indicates the chimney or stack, through the base of which the channel passes and within which the purifying of the liquid is effected.

D indicates a perforated plate or tuyere arranged across the bottom of the channel A within the base of the chimney-stack for covering or forming the exit end of the blast-pipe $e$, connecting therewith from an air-compressor or blowing-engine, E, arranged at convenient position and adapted for inducing a blast through said pipe and tuyere. In the present instance I have shown a series of four tuyeres, each connected with a separate blowing-engine. I do not, however, desire to confine my invention to any particular number of tuyeres and blowing mechanisms, as one or more may be employed, according to the capacity and requirements of the plant.

The chimney or stack C is preferably erected some two hundred feet, more or less, in height and of a diameter or sectional area sufficient to accommodate the amount of material to be treated in its expanded condition as disaggregated or separated by the blast.

The channel where it passes through the base of the chimney is preferably inclined downward and contracted laterally, and the floor-area of the stack at the sides of the channel is preferably inclined in such manner that the water will flow back into the channel, preferably toward the entrance, although these forms and inclinations may be subject to modification under different conditions of service, or made as most convenient in any particular case.

The tuyere-plates are preferably constructed as shown in detail in Figs 7, 8, and 9. Said plates are provided with rows of perforations or elongated slots $d$, arranged to break joints with each other and disposed laterally of the water-channel. The plates are laid flush, or nearly so, with the bottom of the water-way or channel, which bottom is preferably formed of flat stone or other suitable material, as at $a$. The plates D are secured by screws or other suitable fastenings to the top of the air-boxes $d'$, which form the terminations of the blast-pipes $e$, in the manner illustrated.

The perforations $d$ in the tuyere-plates may be formed straight through or be inclined, so that the blast will issue somewhat at an angle, instead of directly perpendicular with the plane of the plate.

F denotes the steam-boilers and furnaces for generating steam to operate the blowing-engines, and for such other purposes as may be desired about the works.

F' indicates the flue for conducting the smoke and products of combustion from the boiler-furnaces into the chimney-stack. Said flue terminates in an upwardly-directed cowl, $F^2$, located within the chamber of the chimney and formed in such manner that the upward blast within the chimney will assist the draft of the boiler-furnaces, or so that said blast will not give back-pressure against the draft of the furnaces. The lower end of the cowl $F^2$ is preferably made with an inverted conical bottom provided with a small opening at $f$ to permit any water that may in any way be caught in the cowl to drip out instead of flowing back into the smoke-pipe.

G indicates the steam-pipe for supplying steam to the blowing-engines or compressors E.

H H' indicate wire nettings or screens arranged across the space within the chimney-stack at any desired height, which screens serve to assist the breaking and aerating of the particles of water thrown up by the blast. Said screens may, in some instances, be omitted if desired.

The screens B, B', and $B^2$ are made of wire-netting in the form of endless traveling aprons extending across the channel A and disposed in positions inclined or oblique to the bed of said channel. Said screens are mounted on revoluble supports or rollers $b$ $b'$, the lower support being arranged in a suitable pit formed in the bed of the channel and the upper one being arranged at suitable height above the channel, with its axle-shaft connected by suitable gearing, $i$, with a driving-shaft, I, by means of which motion is imparted thereto for rotating the screens. The first screen, B, is preferably made from netting of one-half to one inch mesh, more or less, or suitably adapted for collecting and removing large floating substances—such as blocks, sticks, and dead animals. The second screen, B', can be made from netting of one-eighth to one-fourth inch mesh, more or less, or adapted to collect and remove floating substances of a smaller size than the first screen, while the third screen, $B^2$, can be of one sixty-fourth to one-twentieth inch mesh, or as fine as will conveniently permit the sewage water or liquid to pass through while straining out or collecting all or substantially all of the floating material borne by the water.

The channel A is preferably made with offsets, as at J, the several screens being successively of increased width, while guides or directing-wings K are arranged in connection therewith to cause the deposit to lodge upon the central portion of the screens and not at the extreme edge thereof.

Aprons L are arranged at the bottom of the channel, which extend over the lower part of the screens and prevent the sewage from flowing under the screens. Laterally-disposed traveling aprons or conveyers M are arranged for receiving the sludge or material which drops from the screens as they revolve, and by means of said lateral conveyers the collected material is conveyed beyond the wall at one side of the channel and deposited in vats or cars N, whence it can be conveniently removed or taken care of, as desired. Said transverse conveyers are operated by gearing $m$ from the shaft I, or in other convenient manner.

P indicates a power-wheel arranged in the channel to be actuated by the flow of the sewage-water, and said wheel is connected by suitable gearing, as at R and R', for operating the shaft I and screening mechanism.

T denotes a gate arranged across the channel in front of the wheel P and provided with suitable operating mechanism, $t$, for shutting off and letting on the flow of water when desired.

V and V' indicate swinging gates for closing the air-space between the water and the arches where the channel passes beneath the walls of the stack.

In lieu of using a wheel, as P, for imparting movement to the screen mechanism, said mechanism can, if preferred, be operated by a steam-engine or other motor.

To avoid complexity of drawing, in Figs. 1 and 2 I have not shown the bearing-supports for the shaft, gearing, and screen supporting roll-axles; but it will be understood that such journal-supports may be made in any suitable well-known manner.

If desired, devices may be combined with the traveling screens or with their supporting and driving mechanism for shaking or jarring the netting, so that adhering substances will be shaken therefrom onto the lateral transfer-aprons M. In Figs. 5 and 6 I have shown one style of mechanism which can be employed for this purpose. In this the journals of the screen-supporting roll $b$ are mounted in movable bearings U, which can rise and fall, said bearings being connected by arms U′ with an auxiliary driving-shaft, $b^2$, the end of the roller-journal being provided with a wiper-cam, W, which, as the screen-supporting roll revolves, alternately raises the journal and roll and permits it to suddenly drop, so that the bearing will strike the supporting-abutment with a sudden shock, thereby shaking the screen which is supported on said roll and effecting dislodgment of any substance adhering thereto.

The chimney or blowing mechanism, operating as herein described, can, if desired, be used for purifying or aerating water or sewage in some instances without a preceding system of screens or in connection with a system of screens other than that herein shown and described, and I desire to include such use as within the scope of my invention.

In the operation of the screen mechanism the endless traveling screens are revolved in the direction indicated with a slow movement, (or with an intermittent action, if preferred,) and as the sewage or water flows through the netting the floating substances brought along with the water are caught and lodged upon the screen, and as said screen moves upward such substances are carried up by the screen-netting and pass over the top supporting-roll, $b$, where they fall from the screen onto the transversely-traveling apron M, which apron, being in motion, conveys them to the dump or car N.

The sewage water or liquid, S, to be purified is caused to flow into the base of the stack C, in a thin uniform stream of some four to six inches (more or less) in depth, and as it passes over the tuyere-plates it meets the strong current of air which is forced up through the orifices $d$ by the blowing mechanism, and the stream of water is thereby disaggregated by being blown up or elevated within the chamber of the stack in the form of spray or fine particles, which are thrown against the screens H, the action of the blast serving to purify and aerate the water or sewage.

The foul vapors blown from the water rise within the stack, mingling with and becoming disinfected by the hot gases or products of combustion introduced from the boiler-furnaces, and pass out at the top of the chimney at such a height that they cause no unpleasant odors or injurious effects in the atmosphere in the vicinity of the works, while the heavier mass of the water is blown up and thrown back and forth within the stack until it eventually finds its way out through the exit-passage at A′ in a purified condition.

The stack C and blast apparatus, such as described, may be employed for aerating water-supply for towns and similar purposes. In such a case the products of combustion need not be turned into the stack, and the stack could be made of less height than hereinbefore specified; but for the treatment of sewage, which is the prime object of the invention, I prefer the construction specified.

I am aware that heretofore air has been forced through water and sewage for the purpose of aeration and purification, and I do not, therefore, herein broadly claim the use of an air-blast for such purpose. My invention refers to the method whereby the purification is effected in connection with a chimney or stack, and means for disaggregating the stream of sewage and elevating it into spray within the stack in the manner hereinbefore set forth.

I am also aware that a mechanism has been patented in a foreign country wherein a traveling belt composed of plates of filtering material is arranged to receive the sewage poured upon the top surface thereof from the mouth of the drain-pipe; also, that traveling belts having prongs or projecting points for clearing slitted strainers have been devised. Such mechanisms are, however, different from my revolving screens, disposed in the approach of the main channel, and do not perform their operations.

What I claim as of my invention, and desire to secure by Letters Patent, is—

1. The process of treating sewage for purification, which consists in passing a stream of sewage water or liquid into the base of a chimney-stack and therein disaggregating and aerating the same into spray by a blast of air forced through the inflowing liquid, substantially as hereinbefore described.

2. The process of treating sewage for purification, which consists in conducting a stream of sewage-liquid through the base of the chimney-stack, disaggregating and elevating said liquid into spray within the chimney by a forced blast of air, and mingling with the resultant vapors hot gases or products of combustion introduced from a furnace or furnaces, substantially as set forth.

3. The combination, in a purifying-plant, of a chimney-stack having at its base a channel for the flow of liquid, a perforated tuyere-plate disposed in the bottom of said channel, and blowing mechanism for forcing a blast through said tuyere-plate, substantially as and for the purpose set forth.

4. The combination, in a purifying-plant, of a chimney-stack having a channel through its base, a perforated tuyere plate or plates disposed at the bottom of said channel within the chamber of said stack, blast-passages leading to said tuyeres, and blowing mechanism for inducing an upwardly-directed blast therethrough, and a flue or passage for introducing hot gases or products of combustion into said chimney, substantially as and for the purposes set forth.

5. In a plant for treating sewage, the combination of a channel or water-way, a series of endless traveling screens arranged therein, a chimney-stack, through the base of which said channel passes, and air-blast devices adapted for disaggregating the mass of sewage within the chamber of said chimney, substantially as and for the purposes set forth.

6. In a purifying-plant, the combination of a chimney-stack, a water-way or channel passing through the base of said stack, a system of blast-tuyeres disposed across the bottom of said channel, blast-pipes leading to said tuyeres, blowing-engines connected with said pipes, steam-generating apparatus having its furnace-flue extending into said chimney, and a system of straining-screens disposed in the water-way in advance of its entrance to the stack, substantially as set forth.

7. In a purifying-plant for sewage, the combination, with the channel or water-way provided with a pit in its bed, of an endless traveling screen disposed transversely across said channel and mounted on upper and lower revoluble supports, the lower support being disposed within said pit and the upper support above the channel having its shaft connected by gearing with driving mechanism, as described, for imparting motion to said screen, substantially as and for the purpose set forth.

8. In a purifying-plant for sewage, the combination, with the channel or water-way provided with an offset or pit in its bed, of the endless traveling screen disposed in inclined position transversely across said channel and mounted on upper and lower revoluble supports respectively disposed at the bottom and the upper part of the channel, and the laterally-disposed discharge-belt extending across the channel beneath the upper part of the screen, and gearing and driving mechanism, substantially as described, for imparting motion to said screen and to said discharge-belt, as set forth.

9. The combination, with the chimney-stack having the water-way or channel through the base thereof and the blast-tuyeres in the bed of said channel, of the netting or screen H in the chamber of the stack above said channel, substantially as and for the purpose set forth.

10. The combination, with the chimney-stack having a channel or water-way in the base thereof, with blast-tuyeres in the bed of said channel, and the flue F, of the upwardly-directed cowl F², located within the chamber of the stack, substantially as and for the purpose set forth.

11. The combination, with the channel or water-way A, having offsets J, of the endless screens, their supporting-rolls, and the guide-aprons L, substantially as and for the purpose set forth.

Witness my hand this 15th day of December, A. D. 1886.

LORING COES.

Witnesses:
CHAS. H. BURLEIGH.
ELLA P. BLENUS.